United States Patent
Wang et al.

(10) Patent No.: US 12,111,552 B2
(45) Date of Patent: Oct. 8, 2024

(54) ARRAY SUBSTRATE, MANUFACTURING METHOD THEREOF, AND PANEL

(71) Applicant: SHENZHEN CHINA STAR OPTOELECTRONICS SEMICONDUCTOR DISPLAY TECHNOLOGY CO., LTD., Shenzhen (CN)

(72) Inventors: Haijun Wang, Shenzhen (CN); Jiangbo Yao, Shenzhen (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 300 days.

(21) Appl. No.: 17/420,100

(22) PCT Filed: May 28, 2021

(86) PCT No.: PCT/CN2021/096974
§ 371 (c)(1),
(2) Date: Jun. 30, 2021

(87) PCT Pub. No.: WO2022/193439
PCT Pub. Date: Sep. 22, 2022

(65) Prior Publication Data
US 2023/0194943 A1 Jun. 22, 2023

(30) Foreign Application Priority Data
Mar. 19, 2021 (CN) .......................... 202110296422.8

(51) Int. Cl.
*G02F 1/1368* (2006.01)
*G02F 1/1362* (2006.01)

(52) U.S. Cl.
CPC ...... *G02F 1/1368* (2013.01); *G02F 1/136218* (2021.01); *G02F 1/136222* (2021.01)

(58) Field of Classification Search
CPC ............ G02F 1/1368; G02F 1/136218; G02F 1/136222
See application file for complete search history.

(56) References Cited

U.S. PATENT DOCUMENTS

| | | | | |
|---|---|---|---|---|
| 2002/0125410 A1* | 9/2002 | Zhang | ............... | H01L 27/14687 257/E27.141 |
| 2009/0207332 A1* | 8/2009 | Zhang | ............... | G02F 1/136227 349/116 |

(Continued)

FOREIGN PATENT DOCUMENTS

| | | |
|---|---|---|
| CN | 105136378 A | 12/2015 |
| CN | 204988604 U | 1/2016 |

(Continued)

*Primary Examiner* — Hoan C Nguyen
(74) *Attorney, Agent, or Firm* — PV IP PC; Wei Te Chung

(57) ABSTRACT

The present application provides an array substrate, a manufacturing method thereof, and a display panel. A display area of the array substrate includes a functional area, a sensing unit is arranged on a part of a base substrate corresponding to the functional area, the sensing unit is aligned with a pixel electrode, and a metal-covered area and a non-metal-covered area can form a same voltage difference with a common electrode, so that a deflection angle of each part of liquid crystal molecules in the functional area is consistent, and a problem of a difference between brightness and darkness of the display panel is solved.

14 Claims, 10 Drawing Sheets

(56) References Cited

U.S. PATENT DOCUMENTS

| | | | |
|---|---|---|---|
| 2009/0279029 A1* | 11/2009 | Kunii | G02F 1/13318 345/175 |
| 2011/0193816 A1* | 8/2011 | Kitakado | G06F 3/044 345/174 |
| 2011/0221722 A1* | 9/2011 | Yoshida | G02F 1/1362 345/206 |
| 2012/0256218 A1* | 10/2012 | Kwack | H10K 50/854 257/40 |
| 2012/0268396 A1* | 10/2012 | Kim | G02F 1/136227 345/173 |
| 2012/0300158 A1 | 11/2012 | Chae et al. | |
| 2013/0037815 A1* | 2/2013 | Okajima | G06F 3/042 257/E29.273 |
| 2014/0211106 A1* | 7/2014 | Shi | G06F 3/0412 349/12 |
| 2020/0119120 A1* | 4/2020 | Feng | H10K 59/126 |
| 2021/0143371 A1* | 5/2021 | Choi | H10K 50/8445 |

FOREIGN PATENT DOCUMENTS

| | | | |
|---|---|---|---|
| CN | 108269817 A | | 7/2018 |
| CN | 109212800 A | | 1/2019 |
| CN | 109521596 A | | 3/2019 |
| CN | 111725276 A | | 9/2020 |
| JP | 2009244638 A | * | 10/2009 |
| KR | 20150137278 A | | 12/2015 |

\* cited by examiner providing a base substrate, wherein the base substrate comprises a display area, the display area comprises at least one functional area, and at least one sensing unit is formed on a portion of the base substrate corresponding to the functional area; — S10 forming a planarization layer on the base substrate and covering the sensing unit; and — S20 forming a plurality of pixel electrodes on a side of the planarization layer away from the base substrate, wherein in a thickness direction of the base substrate, each of the sensing unit is aligned with one of the pixel electrodes. — S30

FIG. 8

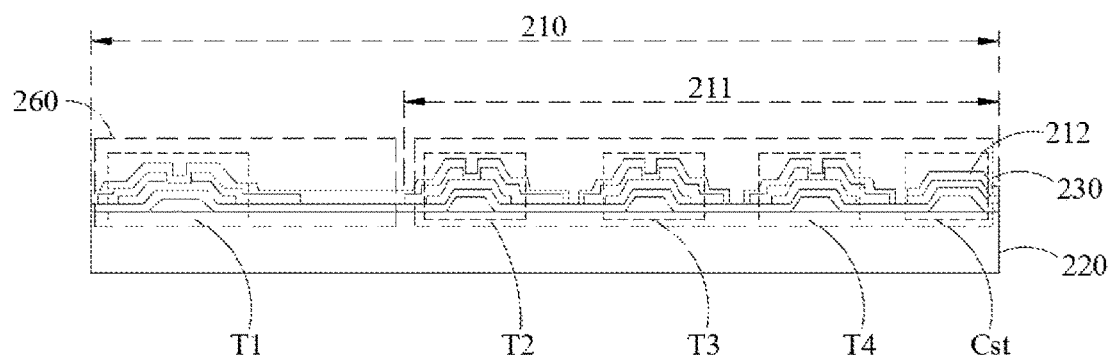

FIG. 9 a

ARRAY SUBSTRATE, MANUFACTURING METHOD THEREOF, AND PANEL

RELATED APPLICATIONS

This application is a Notional Phase of PCT Patent Application No. PCT/CN2021/096974 having international filing date of May 28, 2021, which claims the benefit of priority of Chinese Patent Application No. 202110296422.8 filed on Mar. 19, 2021. The contents of the above applications are all incorporated by reference as if fully set forth herein in their entirety.

BACKGROUND OF INVENTION

Field of Invention

The present invention relates to the field of display technology, in particular to an array substrate, a manufacturing method thereof, and a display panel.

Description of Prior Art

Thin film transistor liquid crystal displays (TFT-LCDs) are widely used in the flat panel display industry due to their features of light weight, thinness, small size, low power consumption, no radiation, and relatively low manufacturing costs. In order to broaden commercial and household functions of LCD displays, many functions are now integrated into the LCD displays, such as color temperature sensing, laser sensing, and gas sensing, which improve application scenarios of the LCD displays. However, many integrated functions are in new development stages, and there are still many processes and related designs that need to be improved in order to improve performance of liquid crystal displays with multiple integrated functions.

As shown in FIG. 1, FIG. 2a and FIG. 2b, FIG. 1 is a schematic diagram of a plan structure of an existing multifunctional display panel provided by the present application, and FIGS. 2a to 2b are schematic diagrams of stacked structures of existing multifunctional display panels provided by embodiments of the present application, wherein a display panel is composed of a lower polarizer 10, an array substrate 11, a liquid crystal layer 12, a color film substrate 13, an upper polarizer 14, and a backlight module 15. An overall structure of the display panel is divided into a display area 100 and a functional area 110. The display area 100 is responsible for color conversion and display functions of the display panel. The functional area 110 is responsible for environmental sensing functions such as color temperature sensing and laser sensing. In order to achieve the above functions, collaboration of the functional thin film transistor 113, the switching thin film transistor 114, and the storage capacitor 115 provided in the functional area is needed. The introduction of the functional area 110 is bound to enrich overall functions of the display panel. However, since the functional area 110 has multiple metal layers, and the metal layers do not transmit light, this results in a lower light transmittance in an area covered by the metal in the functional area 110 and a higher light transmittance in an area without metal coverage, causing different brightness and darkness in different positions of the functional area 110, which impacts an overall visual effect of the display panel.

As shown in FIG. 2a, when the display panel is in a bright state, the display area 100 applies a voltage to a pixel electrode 112 through a driving thin film transistor 111 to form a voltage difference with a common electrode 131 on the color filter substrate 13, and liquid crystal molecules in the liquid crystal layer 12 are deflected under an action of the electric field, so that light emitted by a backlight module in this area passes through the lower polarizer 10, the array substrate 11, the liquid crystal layer 12, the color film substrate 13, and the upper polarizer 14, and transmits through the entire display panel. When the display panel is in the bright state, light cannot transmit through the area covered by the metal in the functional area 110, while the light can pass through the area without metal coverage. Because signals of different functional devices in the functional area 110 are different, voltage differences formed between different areas without metal coverage in the functional area 110 and the common electrode 131 are different, resulting in different deflection angles of the liquid crystal molecules between the different areas without metal coverage in the functional area 110 and the common electrode 131, and resulting in a significant difference in brightness and darkness of the functional area 110.

As shown in FIG. 2b, when the display panel is in a dark state, voltages of the pixel electrode 112 and the common electrode 131 in the display area 100 are the same, the liquid crystal molecules in the display area 100 are not deflected, and backlight cannot transmit through the display panel. Due to different signals of different functional devices in the functional area 110, there are different voltage differences between the different areas without metal coverage in the functional area 110 and the common electrode 131, which causes the liquid crystal molecules in the functional area 110 to deflect in different directions, resulting in a problem of light leakage in the functional area 110, which causes a contrast of the display panel to decrease.

In view of above, there is a problem of a difference between brightness and darkness in an area of the existing display panel used for environmental sensing. Therefore, there is a need to provide an array substrate, a manufacturing method thereof, and a display panel to improve this defect.

SUMMARY OF INVENTION

Embodiments of the present application provide an array substrate, a manufacturing method thereof, and a display panel, which are employed to solve the problem of a difference between brightness and darkness in an area of the existing display panel used for environmental sensing.

An embodiment of the present application provides an array substrate, the array substrate includes a display area, the display area includes at least one functional area, and the array substrate further includes:
  a base substrate;
  at least one sensing unit configured for environment sensing, wherein the sensing unit is disposed on a part of the base substrate corresponding to the functional area;
  a planarization layer disposed on the base substrate and covering the sensing unit; and
  a plurality of pixel electrodes disposed on a side of the planarization layer away from the base substrate, wherein in a thickness direction of the array substrate, each of the sensing unit is aligned with one of the pixel electrodes.

According to an embodiment of the present application, a plurality of diffusion particles are provided in a portion of the planarization layer corresponding to the functional area.

According to an embodiment of the present application, the diffusion particles include at least one of silica particles, titanium dioxide particles, or barium sulfate particles.

According to an embodiment of the present application, diameters of the diffusion particles are greater than or equal to 1 nanometer and less than or equal to 1 micrometer.

According to an embodiment of the present application, a plurality of pixel units are provided on the array substrate, each of the pixel units has a first driving thin film transistor, and the first driving thin film transistor is connected to a corresponding one of the pixel electrodes.

According to an embodiment of the present application, each of the sensing unit has a second driving thin film transistor, and the second driving thin film transistor is connected to a corresponding one of the pixel electrodes.

According to an embodiment of the present application, at least one repeating unit is provided on a portion of the array substrate corresponding to the functional area; and
wherein the repeating unit includes one pixel unit and one sensing unit that are arranged adjacent to each other, and in the thickness direction of the array substrate, each of the repeating unit is aligned with one of the pixel electrodes.

According to an embodiment of the present application, the array substrate further includes:
at least one shielding electrode disposed on the side of the planarization layer away from the base substrate, wherein in the thickness direction of the array substrate, each of the sensing unit is aligned with one of the shielding electrodes; and
an insulating layer disposed on the side of the planarization layer away from the base substrate, and covering the shielding electrode, wherein the pixel electrodes are disposed on a side of the insulating layer away from the base substrate.

Another embodiment of the present application also provides a display panel, and the display panel includes:
an array substrate;
a color filter substrate disposed opposite to the array substrate; and
a liquid crystal layer disposed between the array substrate and the color filter substrate;
wherein the array substrate includes a display area, the display area includes at least one functional area, and the array substrate further includes:
a base substrate;
at least one sensing unit configured for environment sensing, wherein the sensing unit is disposed on a part of the base substrate corresponding to the functional area;
a planarization layer disposed on the base substrate and covering the sensing unit; and
a plurality of pixel electrodes disposed on a side of the planarization layer away from the base substrate, wherein in a thickness direction of the array substrate, each of the sensing unit is aligned with one of the pixel electrodes.

According to an embodiment of the present application, a plurality of diffusion particles are provided in a portion of the planarization layer corresponding to the functional area.

According to an embodiment of the present application, the diffusion particles include at least one of silica particles, titanium dioxide particles, or barium sulfate particles.

According to an embodiment of the present application, diameters of the diffusion particles are greater than or equal to 1 nanometer and less than or equal to 1 micrometer.

According to an embodiment of the present application, a plurality of pixel units are provided on the array substrate, each of the pixel units has a first driving thin film transistor, and the first driving thin film transistor is connected to a corresponding one of the pixel electrodes.

According to an embodiment of the present application, each of the sensing unit has a second driving thin film transistor, and the second driving thin film transistor is connected to a corresponding one of the pixel electrodes.

According to an embodiment of the present application, at least one repeating unit is provided on a portion of the array substrate corresponding to the functional area; and
wherein the repeating unit includes one pixel unit and one sensing unit that are arranged adjacent to each other, and in the thickness direction of the array substrate, each of the repeating unit is aligned with one pixel electrode.

According to an embodiment of the present application, the array substrate further includes:
at least one shielding electrode disposed on the side of the planarization layer away from the base substrate, wherein in the thickness direction of the array substrate, each of the sensing unit is aligned with one of the shielding electrode; and
an insulating layer disposed on the side of the planarization layer away from the base substrate, and covering the shielding electrode, wherein the pixel electrodes are disposed on a side of the insulating layer away from the base substrate.

Still Another embodiment of the present application also provides a method of manufacturing an array substrate, and the method of manufacturing the array substrate includes:
providing a base substrate, wherein the base substrate includes a display area, the display area includes at least one functional area, and at least one sensing unit is formed on a portion of the base substrate corresponding to the functional area;
forming a planarization layer on the base substrate and covering the sensing unit; and
forming a plurality of pixel electrodes on a side of the planarization layer away from the base substrate, wherein in a thickness direction of the base substrate, each of the sensing unit is aligned with one of the pixel electrodes.

Beneficial effects of the embodiments of the present disclosure: Embodiments of the present application provide an array substrate, a manufacturing method thereof, and a display panel. The array substrate includes a display area, the display area includes at least one functional area, and the array substrate further includes: a base substrate; at least one sensing unit configured for environment sensing, wherein the sensing unit is disposed on a part of the base substrate corresponding to the functional area; a planarization layer disposed on the base substrate and covering the sensing unit; and a plurality of pixel electrodes disposed on a side of the planarization layer away from the base substrate, wherein in a thickness direction of the array substrate, each of the sensing unit is aligned with one of the pixel electrodes, wherein by applying a voltage to the pixel electrode, a metal-covered area and a non-metal-covered area in the functional area can form the same voltage difference with a common electrode of the display panel, so that deflection angles of the liquid crystal molecules corresponding to the metal-covered area and the non-metal-covered area in the functional area are the same, and thereby the metal-covered area and the non-metal-covered area in the functional area have the same brightness, which solves the problem of a difference between brightness and darkness of the existing display panel for environmental sensing.

BRIEF DESCRIPTION OF DRAWINGS

In order to more clearly illustrate the embodiments or the technical solutions of the existing art, the drawings illustrating the embodiments or the existing art will be briefly described below. Obviously, the drawings in the following description merely illustrate some embodiments of the present invention. Other drawings may also be obtained by those skilled in the art according to these figures without paying creative work.

FIG. 8 is a schematic flowchart of a method of manufacturing an array substrate provided by an embodiment of the present application.

FIGS. 9a to 9e are schematic diagrams of structures of the array substrate corresponding to the method of manufacturing the array substrate provided by the embodiment of the present application.

DETAILED DESCRIPTION OF PREFERRED EMBODIMENTS

Figure 1:
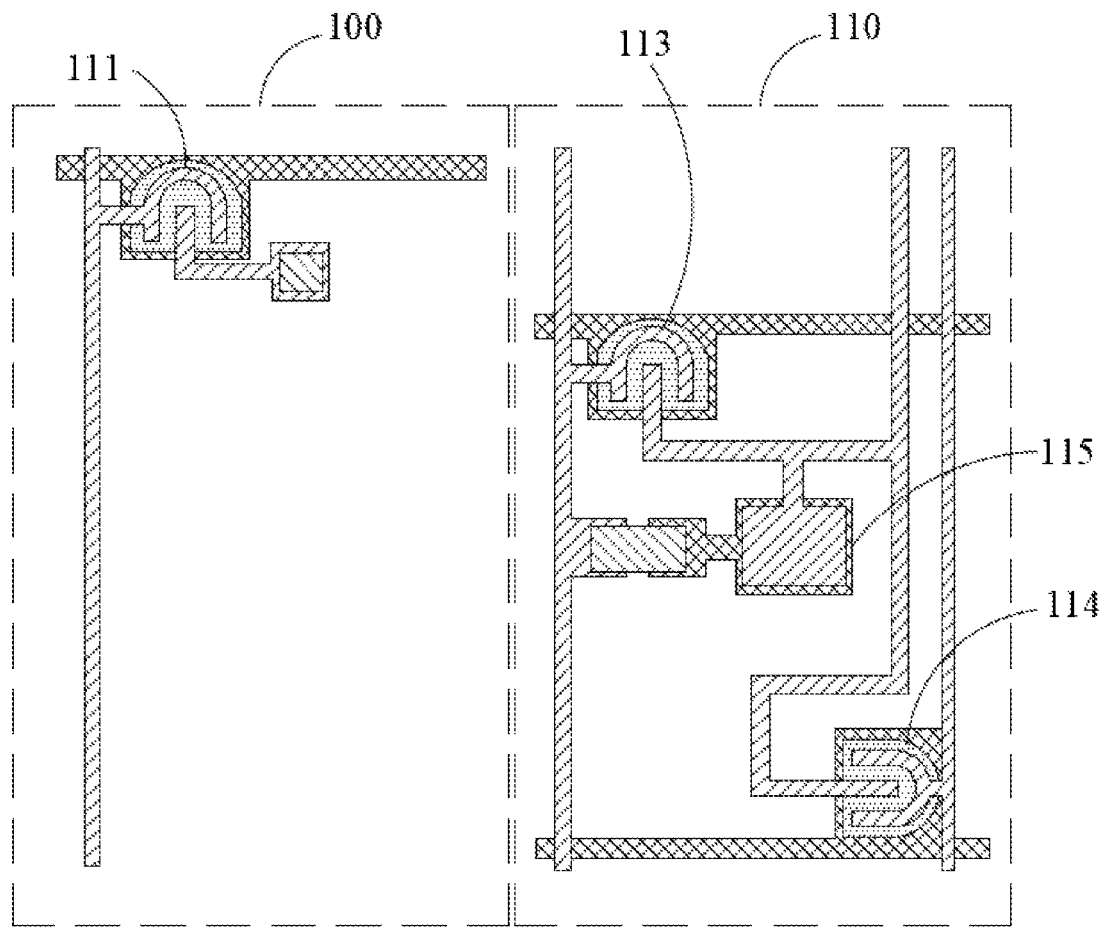
FIG. 1 is a schematic diagram of a plane structure of an existing multifunctional display panel provided by the present application.
Figure 2A:
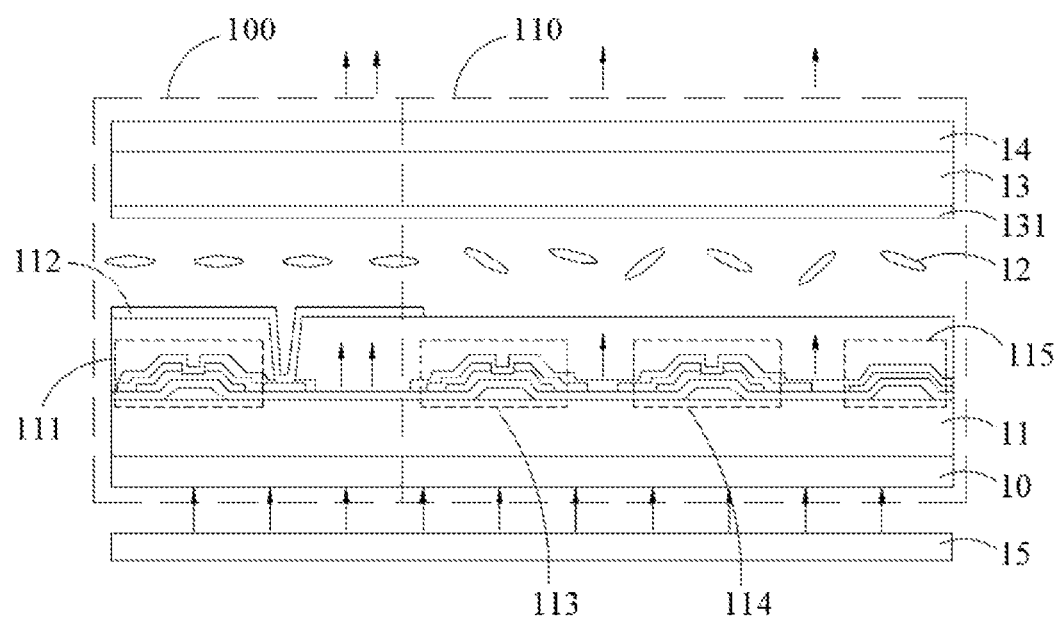
FIGS. 2a to 2b are schematic diagrams of stacked structures of the existing multifunctional display panel provided by embodiments of the present application.
Figure 2B:
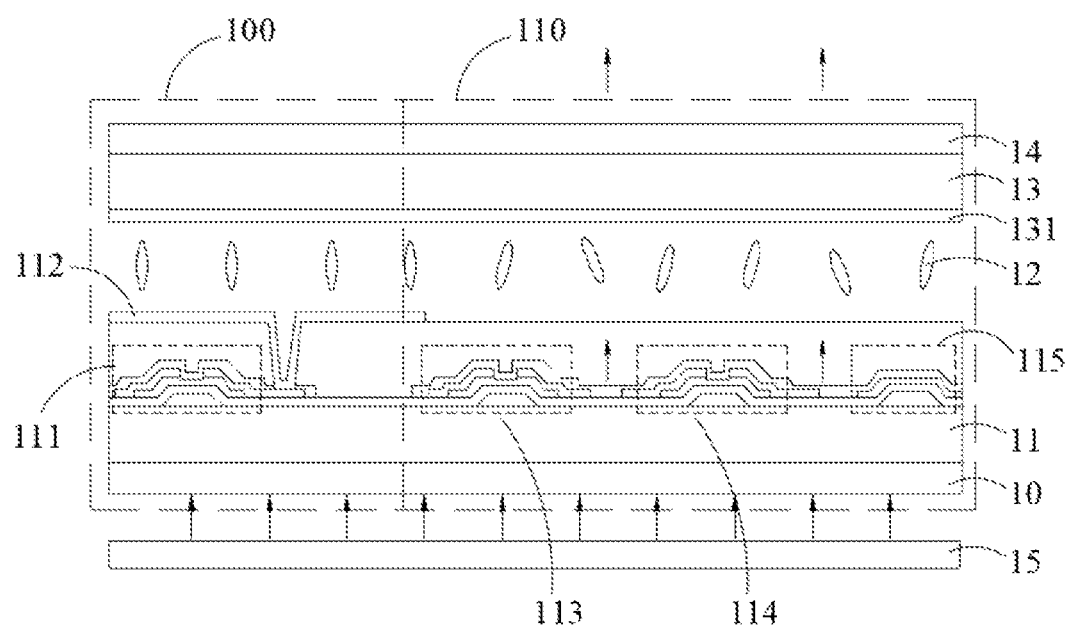

The following description of the various embodiments is provided to illustrate the specific embodiments of the invention. Directional terms mentioned in the present invention, such as "vertical", "horizontal", "upper", "bottom", "pre", "post", "left", "right", "inside", "outside", "side", etc., only refer to the direction of the additional drawing. Therefore, the directional terminology used is for the purpose of illustration and understanding of the invention. In the drawings, structurally similar elements are denoted by the same reference numerals.

Figure 3:
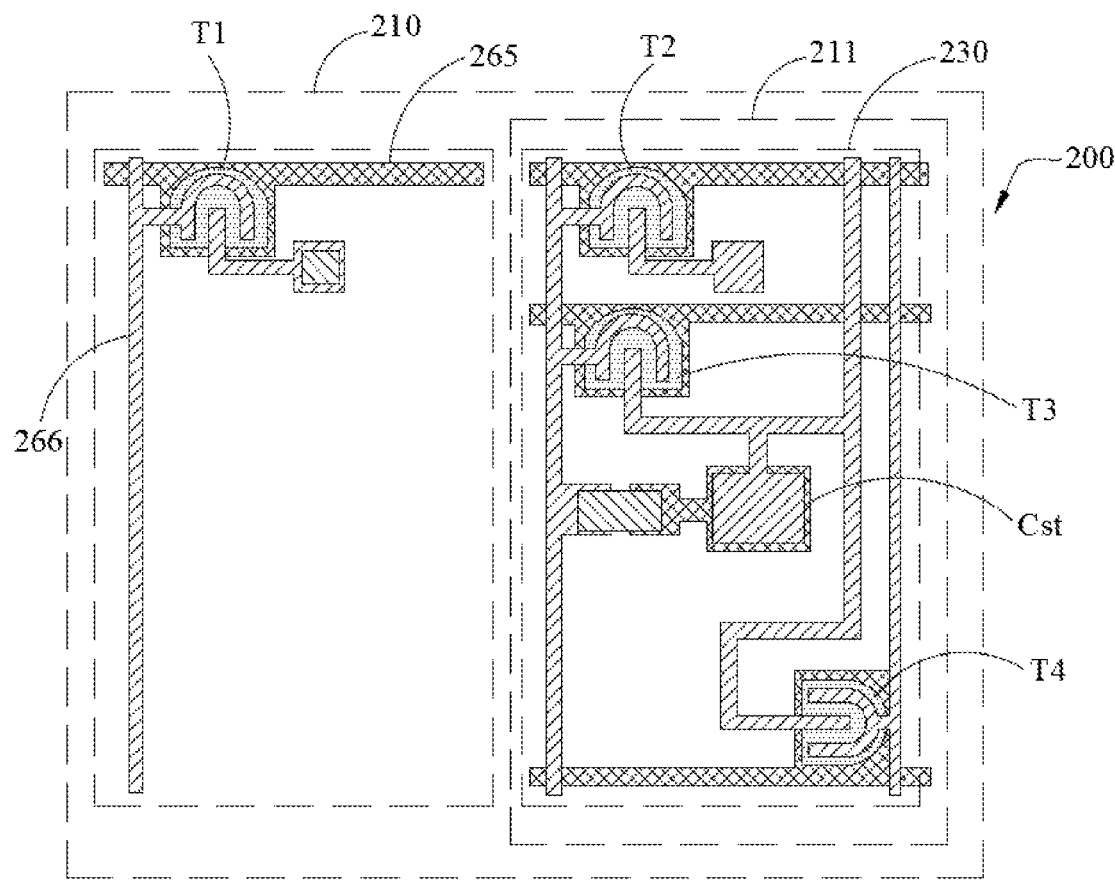
FIG. 3 is a schematic diagram of a plane structure of an array substrate provided by an embodiment of the present application.

The present disclosure will be further described below in conjunction with the drawings and specific embodiments:

An embodiment of the present application provides an array substrate. As shown in FIG. 3, FIG. 3 is a schematic diagram of a plane structure of an array substrate provided by an embodiment of the present application. The array substrate 200 includes a display area 210 and a non-display area (not shown) surrounding the display area. The display area 210 includes at least one functional area 211.

The display area 210 is responsible for color conversion and display functions of the liquid crystal display panel composed of the array substrate 200, a color filter substrate, a liquid crystal layer, and a backlight module (not shown). The functional area 211 is not only responsible for the above-mentioned color conversion and display functions, but also may have environmental sensing functions such as color temperature sensing and laser sensing.

Figure 4:
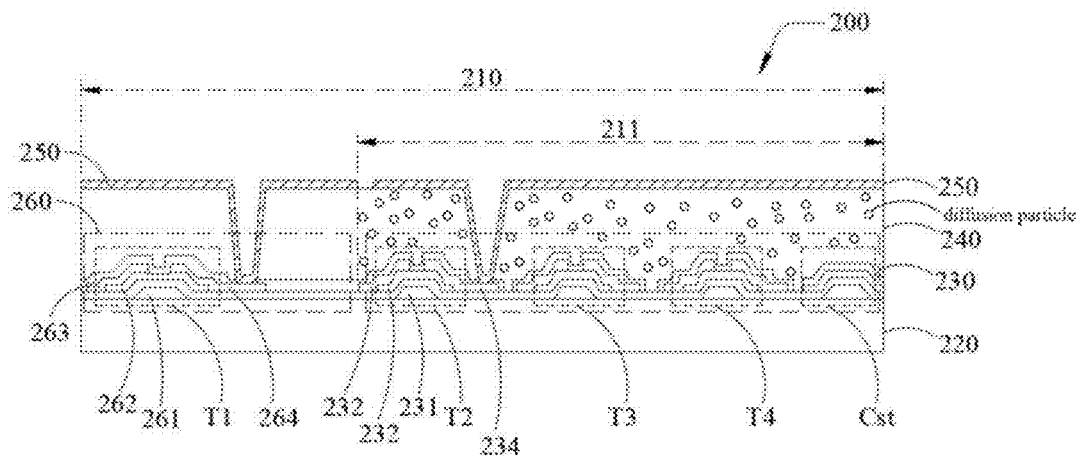
FIG. 4 is a schematic diagram of a stacking structure of a first array substrate provided by an embodiment of the present application.

As shown in FIG. 3 and FIG. 4, FIG. 4 is a schematic diagram of a stacked structure of the first array substrate provided by an embodiment of the present application. The array substrate 200 includes a base substrate 220, at least one sensing unit 230, a planarization layer 240, and a plurality of pixel electrodes 250, and the sensing unit 230 is used for realizing the aforementioned environmental sensing functions such as color temperature sensing and laser sensing. The sensing unit 230 is disposed on a portion of the base substrate 220 corresponding to the functional area 211, and the planarization layer 240 is disposed on the base substrate 220 and covers the sensing unit 230. The plurality of pixel electrodes 250 are arranged on a side of the planarization layer 240 away from the base substrate 220.

In an embodiment of the present application, as shown in FIG. 4, in a thickness direction of the array substrate 200, each sensing unit 230 is aligned with one pixel electrode 250, that is, an orthographic projection area of each sensing unit 230 on the base substrate 220 overlaps an orthographic projection area of the corresponding one of the pixel electrodes 250 on the base substrate. By overlapping the pixel electrode 250 on the sensing unit 230, a voltage can be applied to the pixel electrode 250 to control deflection angles of liquid crystal molecules on the sensing unit 230, so that a same voltage difference is formed between a metal-covered area and a non-metal-covered area in the sensing unit 230 and a common electrode. As a result, the deflection angles of the liquid crystal molecules corresponding to the metal-covered area and the non-metal-covered area in the sensing unit 230 are the same. Therefore, when the display panel is in a bright state, brightness of the metal-covered area and the non-metal-covered area in the functional area 211 are the same, so as to alleviate the problem of brightness difference in the existing functional area. Meanwhile, when the display panel is in the dark state, the voltage of the pixel electrode 250 and the common electrode are the same, and the liquid crystal molecules corresponding to each area of the functional area 211 are not deflected, so that light does not transmit through each area of the functional area 211, thereby solving the problem of light leakage in the functional area 211.

In an embodiment, a plurality of diffusion particles are provided in a portion of a planarization layer 240 corresponding to a functional area 211. When light emitted by a backlight passes through the planarization layer 240, the diffusion particles can diffuse the light so that the light can be diffused to an area covered by metal in the functional area 211, thereby reducing brightness difference between the area covered by metal and an area without metal coverage in the functional area 211, making brightness of the functional area 211 more uniform, thereby alleviating the problem of a difference between brightness and darkness in the functional area 211, and increasing the brightness of the functional area 211. In practical applications, positions of the diffusion particles can be selected according to requirements, and are not limited to the above-mentioned functional area. Alternatively, the diffusion particles can also be provided in portions of the planarization layer 240 corresponding to the functional area 211 and other display areas to improve an overall brightness of the array substrate 200.

Specifically, the diffusion particles are silica particles. In practical applications, types of the diffusion particles can be selected according to requirements, are not limited to the above-mentioned silica particles, and can also be silica particles or barium sulfate particles; or a mixture of two or more particles selected from silica particles, titanium dioxide particles, and barium sulfate particles.

Specifically, diameters of the diffusion particles are 20 nm. In practical applications, the diameters of the diffusion particles can be selected according to requirements, and are not limited to the aforementioned 20 nm. The diameters of the diffusion particles can also be 1 nm, 10 nm, 100 nm, 500 nm, or 1 μm. The planarization layer 240 may include the diffusion particles of the same diameter, or two or more types of particles with different diameters at the same time.

In an embodiment, as shown in FIGS. 3 and 4, a plurality of pixel units 260 are provided on the array substrate, each of the pixel units 260 has a first driving thin film transistor T1, and the first driving thin film transistor T1 is connected to a corresponding one of the pixel electrodes 250. It should be noted that FIGS. 3 and 4 only illustrate the plan structure and layer structure of one pixel unit 260 and one sensing unit 230 disposed on the base substrate 220, and do not represent numbers of pixel units 260 and sensing units 230 provided on the base substrate 220 in an actual application.

Specifically, in an embodiment of the present application, the first driving thin film transistor T1 includes a first gate 261, a first active layer 262, a first source 263, and a first drain 264. The first gate 261 of the first driving thin film transistor T1 is connected to a scan line 265, the first source 263 of the first driving thin film transistor T1 is connected to a data line 266, and the first drain of the first driving thin film transistor T1 is connected to a corresponding one of the pixel electrodes 250 for applying voltage to the pixel electrode 250.

Further, the sensing unit 230 has a second driving thin film transistor T2, and the second driving thin film transistor T2 is connected to a corresponding one of the pixel electrodes 250.

Specifically, in an embodiment of the present application, the second driving thin film transistor T2 includes a second gate 231, a second active layer 232, a second source 233, and a second drain 234. The second gate 231 is connected to the scan line 265, the second source 233 is connected to the data line 266, and the second drain electrode 234 is connected to a corresponding one of the pixel electrodes 250 for applying voltage to the pixel electrode 250.

Further, the sensing unit 230 further includes a functional thin film transistor T3, a switching thin film transistor T4, and a storage capacitor Cst. In an embodiment of the present application, the functional thin film transistor T3 is a photoelectric thin film transistor, which is configured to convert the optical signal in the external environment into an electrical signal which is then stored in the storage capacitor Cst. Under a control of a timing signal, the switching thin film transistor T4 periodically transfers the electrical signal stored in the storage capacitor Cst to the processor. The processor can convert the electrical signal into a digital signal and make corresponding adjustments based on the digital signal. In this way, it can realize sensing functions such as color temperature sensing, laser sensing, and gas sensing. In practical applications, the circuit structure and sensing function of the sensing unit 230 can be set according to requirements, and are not limited to the above-mentioned circuit structure and sensing function. In an embodiment of the present application, a structure of the switching thin film transistor T4 is the same as that of the second driving thin film transistor T2, and a structure of the storage capacitor Cst is also the same as that of the storage capacitor in the prior art, which will not be repeated herein for brevity.

Furthermore, in order to prevent a parasitic capacitance generated between the above-mentioned various devices in the sensing unit 230 and the pixel electrode 250, which results in a crosstalk to a voltage signal of the pixel electrode 250, a thickness of the planarization layer 240 can be increased to 10 μm or more. In this way, the parasitic capacitance can be reduced by increasing a distance between the pixel electrode 250 and the sensing unit 230, thereby reducing an impact of the crosstalk on the voltage signal of the pixel electrode 250 caused by the various devices in the sensing unit 230. In practical applications, an insulating layer can be added between the planarization layer 240 and the pixel electrode 250. A thickness of the insulating layer should be 10 μm or more. As such, the impact of the crosstalk on the voltage signal of the pixel electrode 250 caused by the various devices in the sensing unit 230 can also be reduced.

In an embodiment of the present application, the pixel unit 260 and the sensing unit 230 are independent from each other, and each has a driving thin film transistor and a corresponding pixel electrode. The sensing unit 230 can achieve the same functions of color conversion and light-dark conversion as the pixel unit 260, and therefore, the sensing unit 230 can be regarded as a pixel unit with an environment sensing function. In a display panel composed of a color filter substrate and a liquid crystal layer, color resists can be provided on the color filter substrate corresponding to the pixel unit 260 and the sensing unit 230, so that the sensing unit 230 can achieve the same functions as the pixel unit 260, and thereby a resolution of portions of the array substrate 200 and the display panel corresponding to the functional area 211 can be improved.

In an embodiment of the present application, the pixel unit 260 is arranged in other areas of the display area 210 except the functional area 211, and a plurality of the sensing units 230 arranged in an array are disposed in the functional area 211. Since the sensing unit 230 has the same function as the pixel unit 260, the functional area 211 can achieve the same display effect as other areas of the display area 210 except the functional area 211. Alternatively, in some other embodiments, both of the pixel unit 260 and the sensing unit 230 can be provided in the functional area 211, and the sensing unit 230 can be interspersedly arranged between a plurality of pixel units 260.

In an embodiment of the present application, the display area 210 includes five functional areas 211, and the five functional areas 211 are respectively arranged at four corners and a central portion of the display area 210. In practical applications, a number and positions of the functional areas 211 can be set according to requirements, and are not limited to the above-mentioned number and positions. It can also be 1, 3, 5 or more. Also, the entire display area 210 can also be set as a functional area 211, and the sensing units 230 are distributed in various areas of the display area 210.

Figure 5:
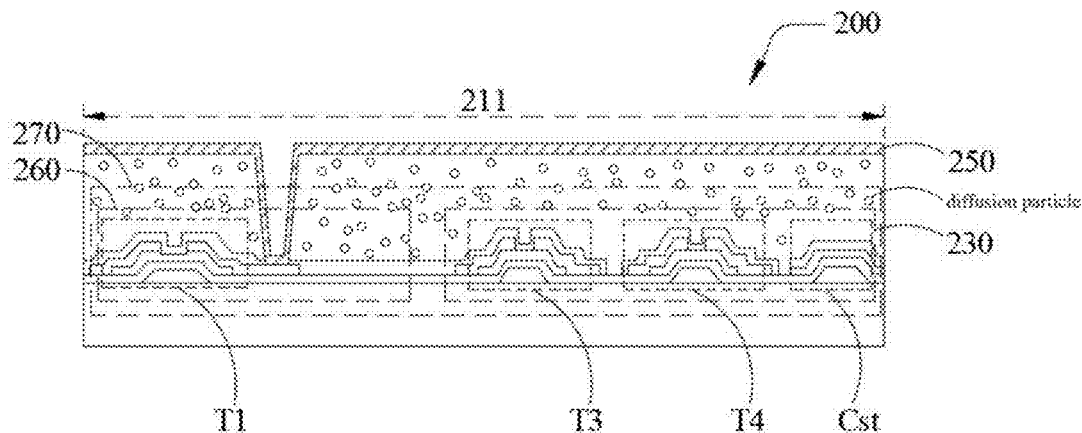
FIG. 5 is a schematic diagram of a stacking structure of a second array substrate provided by an embodiment of the present application.

As shown in FIG. 5, FIG. 5 is a schematic diagram of a stacked structure of a second array substrate provided by an embodiment of the present application, and FIG. 5 only shows the functional area 211 of the array substrate 200 for illustrative purpose. A structure of the second array substrate shown in FIG. 5 is substantially the same as a structure of the first array substrate shown in FIG. 4, except that at least one repeating unit 270 is disposed on a portion of the base substrate 220 corresponding to the functional area 211, the repeating unit 270 includes a pixel unit 260 and a sensing unit 230 arranged adjacent to each other, and in a thickness direction of the array substrate 200, each of the repeating unit 270 is aligned with one of the pixel electrodes 250, that is, an orthographic projection area of the repeating unit 270 on the base substrate 220 overlaps with an orthographic projection area of a corresponding pixel electrode 250 on the base substrate 220.

In an embodiment, a plurality of repeating units 270 are provided on the portion of the base substrate 220 corresponding to the functional area 211, and each of the repeating units 270 is composed of a pixel unit 260 and a sensing unit 230 that are arranged adjacent to each other. FIG. 5 only shows one repeating unit 270 in the functional area 211 for illustrative purpose. Each of the repeating units 270 corresponds to one of the pixel electrodes 250, the pixel unit 260 includes a first driving thin film transistor T1, and the first driving thin film transistor T1 is connected to the pixel electrode 250 for applying a voltage to the pixel electrode 250.

The sensing unit 230 is provided with no second driving thin film transistor T2. The sensing unit 230 is composed of a functional thin film transistor T3, a switching thin film transistor T4, and a storage capacitor Cst. An orthographic projection area of the pixel electrode 250 connected to the first driving thin film transistor T1 on the base substrate 220 overlaps with an orthographic projection area of the sensing unit 230 on the base substrate. In the display panel composed of the array substrate 200 and the color filter substrate, one of the repeating units 270 on the array substrate 200 can correspond to one of the color resists, and therefore one repeating unit 270 can also be considered as an assembly of a pixel unit 260 and a sensing unit 230. In practical applications, the repeating units 270 may not only be arranged in the functional area 211, but also in other areas of the display area 210 except for the functional area 211.

In some other embodiments, the first driving thin film transistor T1 may also be disposed in the sensing unit 230, and the first driving thin film transistor T1 is not disposed in the pixel unit 260, so that an aperture ratio of the pixel unit 260 can be further increased.

Figure 6:
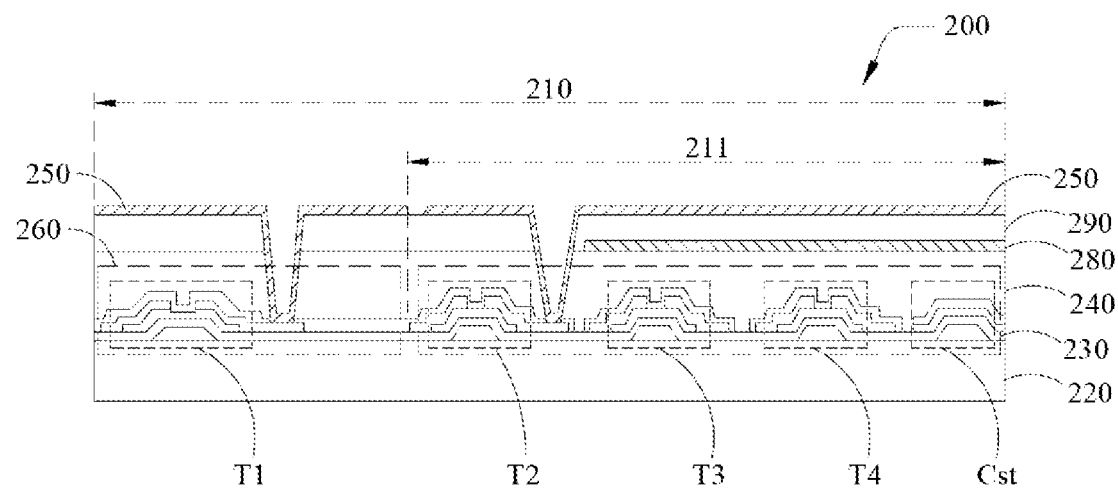
FIG. 6 is a schematic diagram of a stacking structure of a third array substrate provided by an embodiment of the present application.

As shown in FIG. 6, FIG. 6 is a schematic diagram of a stacked structure of a third array substrate provided by an embodiment of the present application. A structure of the array substrate shown in FIG. 6 is substantially the same as the structure of the array substrate shown in FIG. 4. In the array substrate shown in FIG. 6, the array substrate 200 further includes at least one shielding electrode 280.

In an embodiment, the array substrate 200 includes a plurality of shielding electrodes 280, and the shielding electrodes 280 are disposed on a side of the planarization layer 240 away from the base substrate 220, and in a thickness direction of the array substrate 200, each of the sensing units 230 is aligned with one of the shielding electrodes 280, that is, an orthographic projection area of each of the shielding electrodes 280 on the base substrate partially overlaps an orthographic projection area of a corresponding one of the sensing units 230 on the base substrate.

The shielding electrodes 280 are floating electrodes and are not connected to any electrical signals. The pixel electrodes 250 can be separated from each device in the sensing units 230, thereby shielding signals of the various devices in the sensing units 230, and thereby reducing a crosstalk with the pixel electrode 250 caused by the signals of the various devices in the sensing units 230.

The array substrate 200 further includes an insulating layer 290 disposed on a side of the planarization layer 240 away from the base substrate 220 and covering the shielding electrodes 280, and the pixel electrodes 250 are disposed on a side of the insulating layer 290 away from the base substrate 220.

Figure 7A:
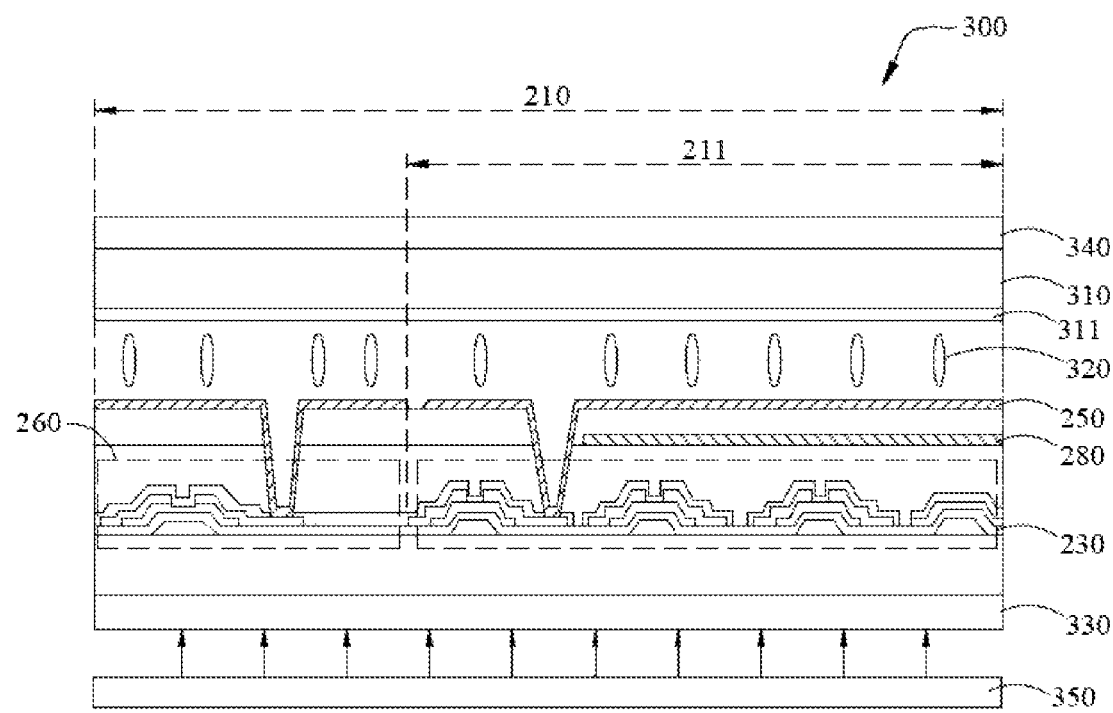
FIGS. 7a and 7b are schematic diagrams of structures of display panels provided by embodiments of the present application.
Figure 7B:
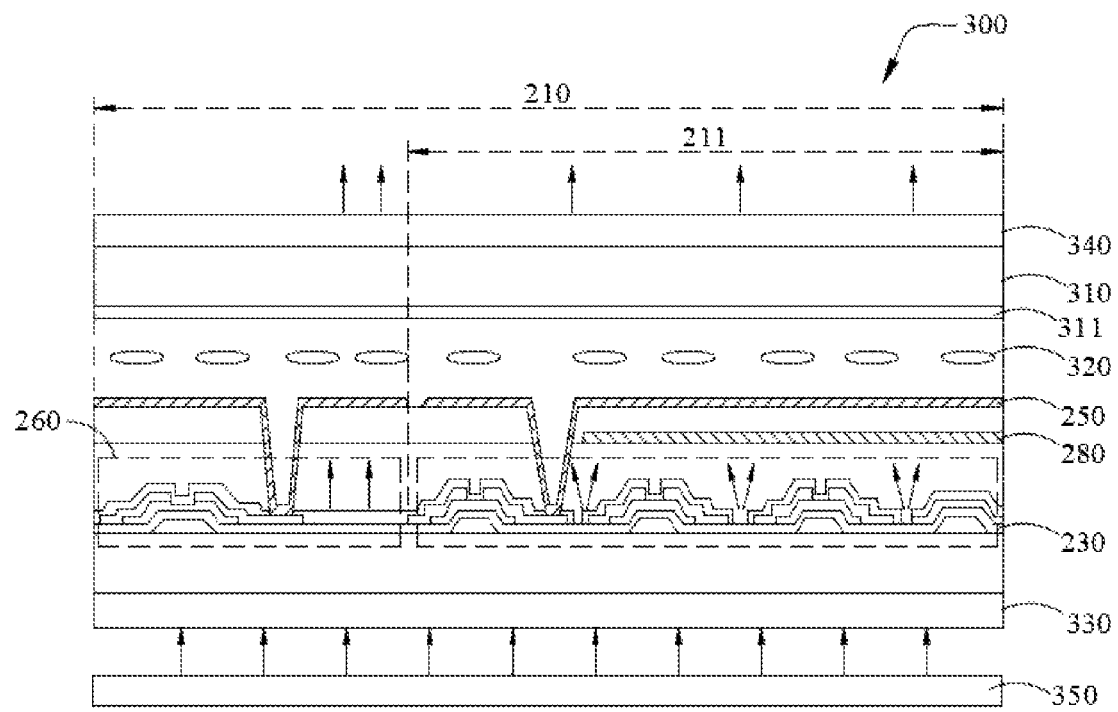

An embodiment of the present application also provides a display panel, as shown in FIG. 7a to FIG. 7b. FIG. 7a and FIG. 7b are schematic structural diagrams, and each shows a display panel 300 provided by an embodiment of the present application. The display panel 300 includes the array substrate 200 provided in the foregoing embodiment. The display panel 300 further includes a color filter substrate 310, a liquid crystal layer 320 disposed between the array substrate 200 and the color filter substrate 310, a lower polarizer sheet 330 disposed on a light incident side of the array substrate 200, an upper polarizer 340 disposed on a light exiting side of the color filter substrate 310, and a backlight module 350 arranged on a side of the polarizer 330 away from the array substrate 200.

The structures of the array substrates in the display panels shown in FIGS. 7a and 7b are the same as the structure of the array substrate shown in FIG. 6, and will not be repeated herein for brevity. In the display panel shown in FIGS. 7a and 7b, the color filter substrate 310 includes a color resist layer (not shown) and a common electrode layer 311. The color resist layer is composed of a plurality of color resists of different colors arranged in an array. Each of the pixel units 260 corresponds to a color resist, and each of the sensing unit 230 corresponds to a color resist. As such, color conversion and display functions of the sensing unit 230 can be realized, and an environment sensing function of the sensing unit 230 can also be realized at the same time.

As shown in FIG. 7a, when the display panel 300 is in a dark state, the shielding electrode 280 can shield signals of the various devices in the sensing units 230, thereby reducing a signal crosstalk with the pixel electrode 250 caused by the signals of the various devices in the sensing units 230, so that the stability of the signal of the pixel electrode 250 is ensured. When voltages of the pixel electrode 250 and the common electrode layer 311 are equal, the liquid crystal molecules in the liquid crystal layer 320 do not deflect, and the light emitted by the backlight module 350 cannot transmit through the display panel 300, so that the display panel 300 is in a dark state.

As shown in FIG. 7b, when the display panel 300 is in a bright state, the shielding electrode 280 can also shield signals of the various devices in the sensing units 230, thereby ensuring the stability of the signals of the pixel electrodes 250. An electric field is formed between the pixel electrode 250 and the common electrode layer 311 to control deflection of the liquid crystal molecules in the liquid crystal layer 320, and deflection angles of the liquid crystal molecules corresponding to the liquid crystal layer 320 and the functional area 211 are the same, so that light can uniformly emit out from the functional area 211 of the display panel 300, thereby alleviating the problem of the difference between brightness and darkness of the functional area 211 of the display panel 300.

It should be noted that, in the embodiments of the present application, the array substrates in the display panels shown in FIG. 7a and FIG. 7b only adopt the structure of the array substrate shown in FIG. 6. However, the structures of the array substrates shown in FIG. 3 to FIG. 5 are also applicable to the display panel provided in an embodiment of the present application, the array substrate 200 in the display panel provided in an embodiment of the present application can also achieve the same technical effects as the array substrate 200 provided in the above-mentioned embodiment, and details will not be repeated for brevity.

Figure 9B:
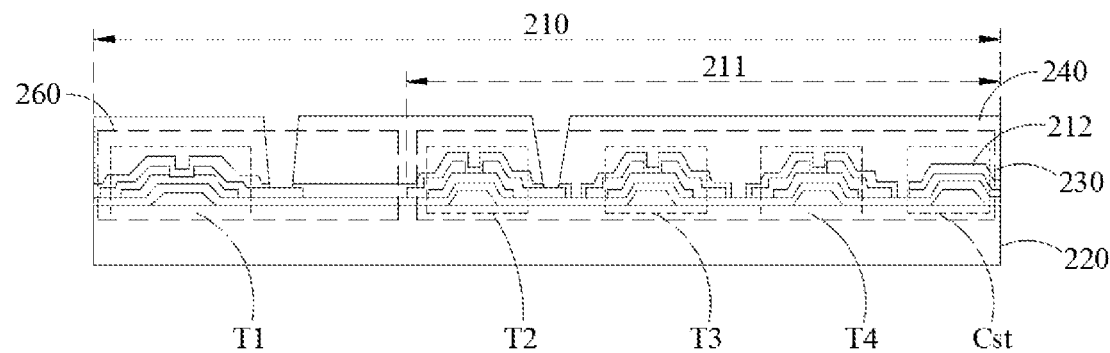
Figure 9C:
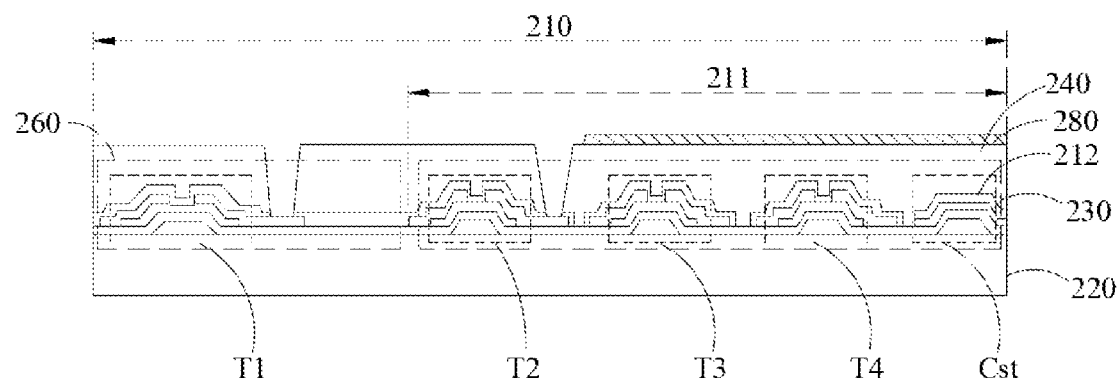
Figure 9D:
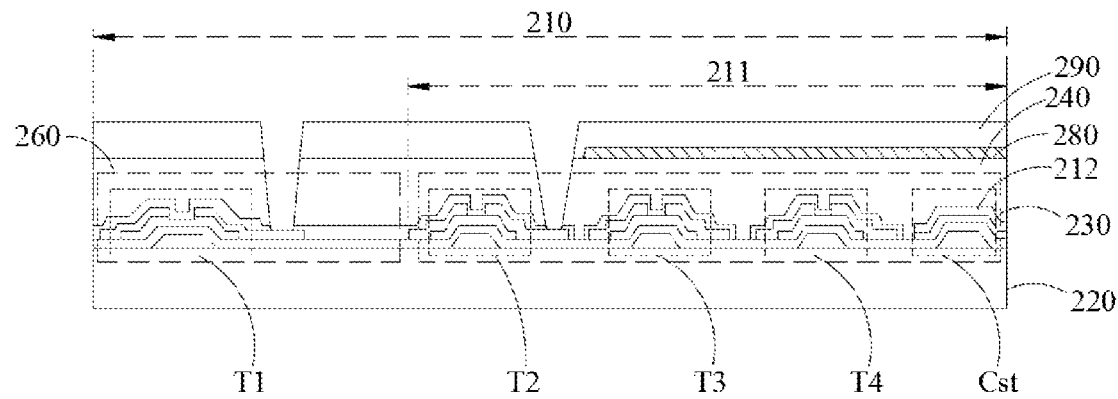
Figure 9E:
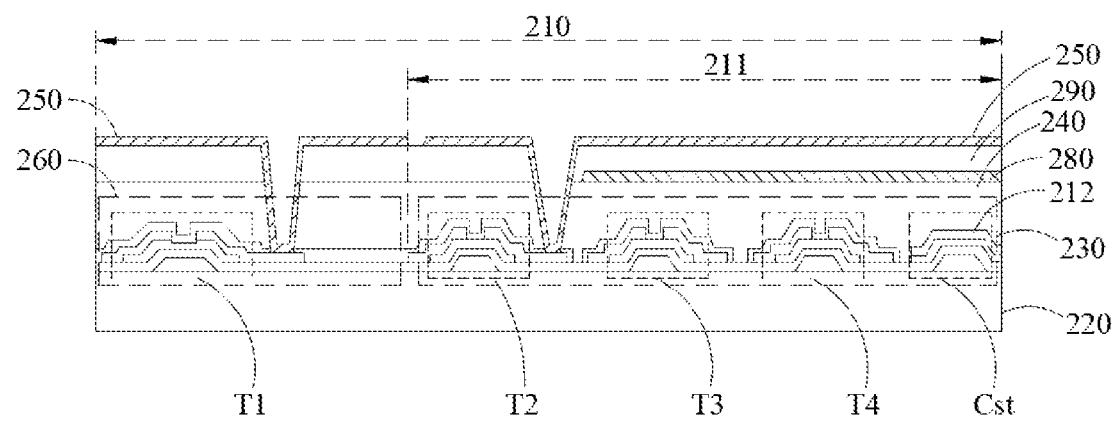

An embodiment of the present application also provides a method of manufacturing an array substrate, as shown in FIG. 8 to FIG. 9e. FIG. 8 is a schematic flowchart of a method of manufacturing an array substrate provided by an embodiment of the present application, FIGS. 9a to 9e are schematic diagrams of structures of the array substrate corresponding to the method of manufacturing the array substrate provided by the embodiment of the present application, and the manufacturing method includes:

Step S10: providing a base substrate 220, wherein the base substrate 220 includes a display area 210, the display area 210 includes at least one functional area 211, and at least one sensing unit 230 is formed on a portion of the base substrate 220 corresponding to the functional area 211.

As shown in FIG. 9a, in the step S10, when the sensing unit 230 is formed, a plurality of pixel units 260 may also be formed at the same time. The pixel unit 260 includes a first driving thin film transistor T1, and the sensing unit 230 includes a second driving thin film transistor T2, a functional thin film transistor T3, a switching thin film transistor T4, and a storage capacitor Cst. Steps of forming the thin film transistor and the storage capacitor can adopt processes of forming the thin film transistor and the storage capacitor in the prior art, which are not repeated herein for brevity.

In the step S10, after the sensing unit 230 and the pixel unit 260 are prepared and formed, a first insulating layer 212 needs to be formed on the sensing unit 230 and the pixel unit 260.

Step S20: forming a planarization layer 240 on the base substrate 220 and covering the sensing unit 230.

As shown in FIG. 9b, in the step S20, the planarization layer 240 is formed on the base substrate 220 and the first insulating layer 212, and the planarization layer 240 is configured to cover the pixel unit 260 and the sensing unit 230. In this way, surfaces of the pixel unit 260 and the sensing unit 230 can be flattened, which facilitates uniform alignment and deflection of the liquid crystal molecules at each position of the display panel, so that a brightness of each position of the display panel is uniform.

In an embodiment, a plurality of diffusion particles are provided in the portion of the planarization layer 240 corresponding to the functional area 211. The diffusion particles can diffuse light so that the light can diffuse to an area covered by metal in the functional area 211, thereby reducing a difference in brightness between the area covered by metal and an area without metal coverage in the functional area 211, so that the brightness of the functional area 211 is more uniform, thereby alleviating the problem of a difference between brightness and darkness in the functional area 211, and increasing brightness of the functional area 211. In practical applications, positions of the diffusion particles can be selected according to requirements, are not limited to the above-mentioned functional area, and diffusion particles can also be provided in portions of the planarization layer 240 corresponding to the functional area 211 and other display areas to improve an overall brightness of the array substrate 200.

Specifically, the diffusion particles are silica particles. In practical applications, types of the diffusion particles can be selected according to requirements, are not limited to the above-mentioned silica particles, and can also be silica particles or barium sulfate particles; or a mixture of two or more particles selected from silica particles, titanium dioxide particles, and barium sulfate particles.

Specifically, diameters of the diffusion particles are 20 nm. In practical applications, the diameters of the diffusion particles can be selected according to requirements, and are not limited to the aforementioned 20 nm. The diameters of the diffusion particles can also be 1 nm, 10 nm, 100 nm, 500 nm, or 1 μm. The planarization layer 240 may include the diffusion particles of the same diameter, or two or more types of particles with different diameters at the same time.

Step S30: forming a plurality of pixel electrodes 250 on a side of the planarization layer 240 away from the base substrate 220, wherein in a thickness direction of the base substrate 220, each of the sensing unit 230 is aligned with one of the pixel electrodes 250.

In an embodiment, the step S30 includes:

Step S301: as shown in FIG. 9c, at least one shielding electrode 280 is formed on a side of the planarization layer 240 away from the base substrate 220, wherein in the thickness direction of the base substrate 220, each of the sensing units 230 is aligned with one of the shielding electrodes 280. That is, an orthographic projection area of the shielding electrode 280 on the base substrate 220 partially overlaps an orthographic projection area of the sensing unit 230 on the base substrate 220.

Step S302: as shown in FIG. 9d, forming an insulating layer 290 on the planarization layer 240, wherein the insulating layer 290 covers the shielding electrode 280.

Step S303: as shown in FIG. 9e, forming a plurality of pixel electrodes 250 on the insulating layer 290, wherein in the thickness direction of the base substrate 220, each of the sensing unit 230 is aligned to one of the pixel electrodes 250. That is, an orthographic projection area of each of the sensing unit 230 on the base substrate 220 overlaps an orthographic projection area of a corresponding one of the pixel electrodes 250 on the base substrate 220.

By applying a voltage to the pixel electrode 250, a metal-covered area and a non-metal-covered area in the functional area 211 can form the same voltage difference with a common electrode of the display panel, so that deflection angles of the liquid crystal molecules corresponding to the metal-covered area and the non-metal-covered area in the functional area 211 are the same, and thereby the metal-covered area and the non-metal-covered area in the functional area 211 have the same brightness, which solves the problem of a difference between brightness and darkness of the existing display panel for environmental sensing. By providing a shielding electrode 280 between the sensing unit 230 and the pixel electrode 250, the shielding electrode 280 is a floating electrode and is not connected to any electrical signal, so that the pixel electrode 250 can be separated from the various devices in the sensing unit 230, thereby shielding signals of the various devices in the sensing unit 230, and thereby reducing a crosstalk with the pixel electrode 250 caused by the signals of the various devices in the sensing unit 230.

In summary, embodiments of the present application provide an array substrate, a manufacturing method thereof, and a display panel. The array substrate includes a display area, the display area includes at least one functional area, and the array substrate further includes: a base substrate; at least one sensing unit configured for environment sensing, wherein the sensing unit is disposed on a part of the base substrate corresponding to the functional area; a planarization layer disposed on the base substrate and covering the sensing unit; and a plurality of pixel electrodes disposed on a side of the planarization layer away from the base substrate, wherein in a thickness direction of the array substrate, each of the sensing unit is aligned with one of the pixel electrodes, wherein by applying a voltage to the pixel electrode, a metal-covered area and a non-metal-covered area in the functional area can form the same voltage difference with a common electrode of the display panel, so that deflection angles of the liquid crystal molecules corresponding to the metal-covered area and the non-metal-covered area in the functional area are the same, and thereby the metal-covered area and the non-metal-covered area in the functional area have the same brightness, which solves the problem of a difference between brightness and darkness of the existing display panel for environmental sensing.

While the invention has been described by way of example and in terms of the preferred embodiments, it is to be understood that the invention is not limited to the disclosed embodiments. To the contrary, it is intended to cover various modifications and similar arrangements. Therefore, the scope of the appended claims should be accorded the broadest interpretation so as to encompass all such modifications and similar arrangements.

What is claimed is:

1. An array substrate, wherein the array substrate comprises a display area, the display area comprises at least one functional area, and the array substrate further comprises:
    a base substrate;
    a plurality of pixel units provided on the base substrate, wherein each of the pixel units includes a first driving thin film transistor;
    at least one sensing unit configured for environment sensing, wherein the sensing unit is disposed on a part of the base substrate corresponding to the functional area, each of the at least one sensing unit includes a second driving thin film transistor, a functional thin film transistor, a switching thin film transistor, and a storage capacitor, the storage capacitor is configured to receive and store the electrical signal, and the switching thin film transistor is configured to control a transmission of the electrical signal stored in the storage capacitor to a processor;
    a planarization layer disposed on the base substrate and covering the at least one sensing unit and the pixel units; and
    a plurality of pixel electrodes disposed on a side of the planarization layer away from the base substrate,
    wherein the first driving thin film transistor is connected to a first pixel electrode of the pixel electrodes, the second driving thin film transistor is connected to a second pixel electrode of the pixel electrodes that is different from the first pixel electrode, the functional thin film transistor is configured for sensing an external environment to generate a corresponding electrical signal, and in a thickness direction of the array substrate, an orthographic projection area of each of the at least one sensing unit on the base substrate is located within an orthographic projection area of the second pixel electrode of the pixel electrodes on the base substrate,
    wherein a source of the second driving thin film transistor is connected to a data line, and a drain of the second driving thin film transistor is connected to the corresponding one of the pixel electrodes.

2. The array substrate according to claim 1, wherein a plurality of diffusion particles are provided in a portion of the planarization layer corresponding to the functional area.

3. The array substrate according to claim 2, wherein the diffusion particles comprise at least one of silica particles, titanium dioxide particles, or barium sulfate particles.

4. The array substrate according to claim 3, wherein diameters of the diffusion particles are greater than or equal to 1 nanometer and less than or equal to 1 micrometer.

5. The array substrate according to claim 1, wherein the array substrate further comprises:
    at least one shielding electrode disposed on the side of the planarization layer away from the base substrate and between the at least one sensing unit and the pixel electrodes, wherein in the thickness direction of the array substrate, an orthographic projection area of each of the at least one shielding electrode on the base substrate partially overlaps with an orthographic projection area of a corresponding one of the at least one sensing unit on the base substrate; and
    an insulating layer disposed on the side of the planarization layer away from the base substrate, and covering the at least one shielding electrode, wherein the pixel electrodes are disposed on a side of the insulating layer away from the base substrate.

6. The array substrate according to claim 1, wherein the functional thin film transistor is a photoelectric thin film transistor.

7. A display panel, the display panel comprising:
    an array substrate;
    a color filter substrate disposed opposite to the array substrate; and
    a liquid crystal layer disposed between the array substrate and the color filter substrate;
    wherein the array substrate comprises a display area, the display area comprises at least one functional area, and the array substrate further comprises:
    a base substrate;
    a plurality of pixel units provided on the base substrate, wherein each of the pixel units includes a first driving thin film transistor;
    at least one sensing unit configured for environment sensing, wherein the sensing unit is disposed on a part of the base substrate corresponding to the functional area, each of the at least one sensing unit includes a second driving thin film transistor, a functional thin film transistor, a switching thin film transistor, and a storage capacitor, the storage capacitor is configured to receive and store the electrical signal, and the switching thin film transistor is configured to control a transmission of the electrical signal stored in the storage capacitor to a processor;
    a planarization layer disposed on the base substrate and covering the at least one sensing unit and the pixel units; and
    a plurality of pixel electrodes disposed on a side of the planarization layer away from the base substrate,
    wherein the first driving thin film transistor is connected to a first pixel electrode of the pixel electrodes, the second driving thin film transistor is connected to a corresponding one second pixel electrode of the pixel electrodes that is different from the first pixel electrode, the functional thin film transistor is configured for sensing an external environment to generate a corresponding electrical signal, and in a thickness direction of the array substrate, an orthographic projection area of each of the at least one sensing unit on the base substrate is located within an orthographic projection area of the second pixel electrode of the pixel electrodes on the base substrate,
    wherein a source of the second driving thin film transistor is connected to a data line, and a drain of the second driving thin film transistor is connected to the corresponding one of the pixel electrodes.

8. The display panel according to claim 7, wherein a plurality of diffusion particles are provided in a portion of the planarization layer corresponding to the functional area.

9. The display panel according to claim 8, wherein the diffusion particles comprise at least one of silica particles, titanium dioxide particles, or barium sulfate particles.

10. The display panel according to claim 9, wherein diameters of the diffusion particles are greater than or equal to 1 nanometer and less than or equal to 1 micrometer.

11. The display panel according to claim 7, wherein the array substrate further comprises:
   at least one shielding electrode disposed on the side of the planarization layer away from the base substrate and between the at least one sensing unit and the pixel electrodes, wherein in the thickness direction of the array substrate, an orthographic projection area of each of the at least one shielding electrode on the base substrate partially overlaps with an orthographic projection area of a corresponding one of the at least one sensing unit on the base substrate; and
   an insulating layer disposed on the side of the planarization layer away from the base substrate, and covering the at least one shielding electrode, wherein the pixel electrodes are disposed on a side of the insulating layer away from the base substrate.

12. The display panel according to claim 7, wherein the functional thin film transistor is a photoelectric thin film transistor.

13. A method of manufacturing an array substrate, comprising:
   providing a base substrate, wherein the base substrate comprises a display area, the display area comprises at least one functional area, a plurality of pixel units is are formed on the base substrate, each of the pixel units includes a first driving thin film transistor, at least one sensing unit is formed on a portion of the base substrate corresponding to the functional area, and each of the at least one sensing unit includes a second driving thin film transistor, a functional thin film transistor, a switching thin film transistor, and a storage capacitor, the storage capacitor is configured to receive and store the electrical signal, and the switching thin film transistor is configured to control a transmission of the electrical signal stored in the storage capacitor to a processor;
   forming a planarization layer on the base substrate and covering the at least one sensing unit and the pixel units; and
   forming a plurality of pixel electrodes on a side of the planarization layer away from the base substrate,
   wherein the first driving thin film transistor is connected to a first pixel electrode of the pixel electrodes, the second driving thin film transistor is connected to a second pixel electrode of the pixel electrodes that is different from the first pixel electrode, the functional thin film transistor is configured for sensing an external environment to generate a corresponding electrical signal, and in a thickness direction of the array substrate, an orthographic projection area of each of the at least one sensing unit on the base substrate is located within an orthographic projection area of the second pixel electrode of the pixel electrodes on the base substrate,
   wherein a source of the second driving thin film transistor is connected to a data line, and a drain of the second driving thin film transistor is connected to the corresponding one of the pixel electrodes.

14. The method according to claim 13, wherein the functional thin film transistor is a photoelectric thin film transistor.

* * * * *